(12) United States Patent
Tschirhart et al.

(10) Patent No.: US 10,257,590 B2
(45) Date of Patent: Apr. 9, 2019

(54) ENTERPRISE TOLL-FREE CALL ROUTING

(71) Applicant: Level 3 Communications, LLC, Broomfield, CO (US)

(72) Inventors: David A. Tschirhart, Dale, TX (US); Joseph M. Roy, Grand Blanc, MI (US)

(73) Assignee: Level 3 Communications, LLC, Broomfield, CO (US)

( * ) Notice: Subject to any disclaimer, the term of this patent is extended or adjusted under 35 U.S.C. 154(b) by 218 days.

(21) Appl. No.: 14/581,796

(22) Filed: Dec. 23, 2014

(65) Prior Publication Data

US 2016/0182980 A1 Jun. 23, 2016

(51) Int. Cl.
| | |
|---|---|
| *H04Q 3/00* | (2006.01) |
| *H04M 3/42* | (2006.01) |
| *H04L 12/14* | (2006.01) |
| *H04M 15/08* | (2006.01) |
| *H04M 15/00* | (2006.01) |

(52) U.S. Cl.
CPC ......... *H04Q 3/005* (2013.01); *H04L 12/1471* (2013.01); *H04M 3/42306* (2013.01); *H04M 15/08* (2013.01); *H04M 15/56* (2013.01); *H04M 15/8044* (2013.01)

(58) Field of Classification Search
CPC ...... H04M 3/42306; H04M 3/00; H04M 7/00; H04M 7/0075; H04M 15/00; H04M 15/08
USPC ............................... 379/114.24, 115.1, 220.1
See application file for complete search history.

(56) References Cited

U.S. PATENT DOCUMENTS

| | | | |
|---|---|---|---|
| 8,570,873 B2* | 10/2013 | Lawson | G06F 9/505 370/235 |
| 2003/0002650 A1 | 1/2003 | Gruchala et al. | |
| 2004/0213392 A1 | 10/2004 | Crockett et al. | |
| 2005/0058270 A1 | 3/2005 | Allen et al. | |
| 2008/0279354 A1 | 11/2008 | Terpstra et al. | |
| 2009/0003543 A1* | 1/2009 | Altberg | H04M 3/42 379/88.13 |
| 2009/0310604 A1* | 12/2009 | Alturi | G06Q 30/0283 370/352 |
| 2013/0128743 A1 | 5/2013 | Lawson et al. | |

(Continued)

OTHER PUBLICATIONS

International Search Report dated Feb. 26, 2016, Int'l Appl. No. PCT/US15/066986, Int'l Filing Date Dec. 21, 2016; 3 pgs.

(Continued)

*Primary Examiner* — Antim G Shah

(57) ABSTRACT

Aspects of the present disclosure involve systems, methods, computer program products, and the like, for providing one or more toll-free services to a customer of an enterprise telecommunications network environment. In particular, the toll-free services may be provided to the customer by one or more application servers associated with the network. Through use of the systems and methods of the present disclosure, such services may be provided for the customer regardless of the method of routing through the network requested by the customer. For example, the toll-free communication may be transmitted through the network based on a destination telephone number associated with the customer. In another example, the toll-free communication is transmitted through the network based on a destination trunk group associated with the customer.

15 Claims, 5 Drawing Sheets

(56) References Cited

U.S. PATENT DOCUMENTS

2014/0098945 A1   4/2014   Terpstra et al.

OTHER PUBLICATIONS

Written Opinion of the International Searching Authority dated Feb. 26, 2016, Int'l Appl. No. PCT/US15/066986, Int'l Filing Date Dec. 21, 2016; 6 pgs.
International Preliminary Report on Patentability dated Jun. 27, 2017, Int'l Appl. No. PCT/US15/066986, Int'l Filing Date Dec. 12, 2015; 8 pgs.
Extended European Search Report, dated Jun. 15, 2018, Application No. 15874223.9, filed Dec. 21, 2015; 12 pgs.

* cited by examiner

ENTERPRISE TOLL-FREE CALL ROUTING

FIELD OF THE DISCLOSURE

Embodiments of the present invention generally relate to systems and methods for implementing a telecommunications network, and more specifically for providing one or more toll-free services in an enterprise network environment.

BACKGROUND

Telecommunication networks provide for the transmission of information across some distance through terrestrial, wireless or satellite communication networks. Such communications may involve voice, data or multimedia information, among others. In addition, telecommunication networks often offer features and/or services to the customers of the network that provide flexible and varied ways in which the communications are transmitted over the network. For example, some telecommunication networks provide toll-free communications in which a called customer may pay for all long-distance telephone calls made to the customer or customer's network. In general, toll-free communications allow a customer to the network to receive calls from disparate locations around the country without passing the cost of such long-distance calls to callers to the customer.

Some toll-free features provided by the network may not be available for some customers, however. For example, customers to the network may utilize a dedicated trunk group to connect to the network. A dedicated trunk group is a trunk of the network that is reserved or dedicated to a particular customer. Such a connection to the network may be attractive to a customer that needs several communication lines to the network. In this manner, the network may route all communications intended for the customer to the dedicated trunk group so that the customer may route the incoming communications to the proper destination. However, routing of toll-free communications through the network may be based, at least in part, on the dedicated trunk group of the customer. Such routing may bypass one or more components of the network that provide toll-free services. In other words, one or more toll-free services provided by the network may not be available to some customers depending on how the customer is connected to the network.

It is with these and other issues that various aspects of the present disclosure were developed.

SUMMARY

One implementation of the present disclosure may take the form of a method for processing a toll-free communication in a telecommunications network. The method may include the operations of receiving a toll-free communication for a dedicated trunk group customer associated with the telecommunications network, routing the toll-free communication to an application server associated with the telecommunications network, applying, through the application server, one or more toll-free features to the toll-free communication, and routing the toll-free communication from the application server to the dedicated trunk group customer associated with the telecommunications network.

Another implementation of the present disclosure may take the form of a telecommunications network. The network may include a network routing engine configured to receive a toll-free communication and route the toll-free communication in the telecommunications network, wherein the destination of the toll-free communication is a dedicated trunk group customer associated with the telecommunications network. The network may also include a toll-free application server configured to receive the toll-free communication from the network routing engine, apply one or more toll-free features to the toll-free communication, and route the toll-free communication from the application server to the dedicated trunk group customer associated with the telecommunications network.

Yet another implementation of the present disclosure may take the form of a method for operating a telecommunications network. The method may include the operations of receiving a toll-free communication request from a user's device in communication with the telecommunications network, the toll-free communication request for a dedicated trunk group customer associated with the telecommunications network and transmitting the toll-free communication request to a routing device of the telecommunications network, the routing device configured to associate a trunk group identifier and a dialed toll-free telephone number with the toll-free communication request. The method may also include routing the toll-free communication request to an application server associated with the telecommunications network based at least on the dialed toll-free telephone number associated with the toll-free communication request, applying, through the application server, one or more toll-free features to the toll-free communication request, and routing the toll-free communication request from the application server to the dedicated trunk group customer associated with the telecommunications network.

DETAILED DESCRIPTION

Aspects of the present disclosure involve systems, methods, computer program products, and the like, for providing one or more toll-free services to a customer of an enterprise telecommunications network environment. In particular, the toll-free services may be provided to the customer by one or more application servers associated with the network. The application server(s) may be included in a virtual or enterprise network of the customer supported by a telecommunications network. Through the application server, one or more Class 5 toll-free services may be provided, such as but not limited to, concurrent calling features, third party conferencing, overflow routing, and the like. Through use of the systems and methods of the present disclosure, such services may be provided for the customer regardless of the method of routing through the network requested by the customer. For example, the toll-free communication may be transmitted through the network based on a destination telephone number associated with the customer. In another example, the toll-free communication is transmitted through the network based on a dedicated trunk group identifier, known as the Destination Trunk Group, associated with the customer.

Previously, the type of destination routing of the toll-free communication utilized for the customer determined the type and availability of certain toll-free features of the network so that some features, such as the concurrent calling feature, was not available to some customers. In particular, some toll-free communication features provided by an application server associated with an enterprise network of the customer was generally not available to customers that utilized dedicated trunk group destination routing as the application server was typically bypassed by the routing of the communication through the network. In addition, enterprise networks that utilized the application server may also lose some functionality, such as identification of the original dialed number of the toll-free communication. As one or more of such toll-free features may be desired by customers of the network utilizing a dedicated trunk group type routing, the present disclosure provides systems and methods for providing application server based toll-free communication features to such customers of the telecommunications network.

Figure 1:
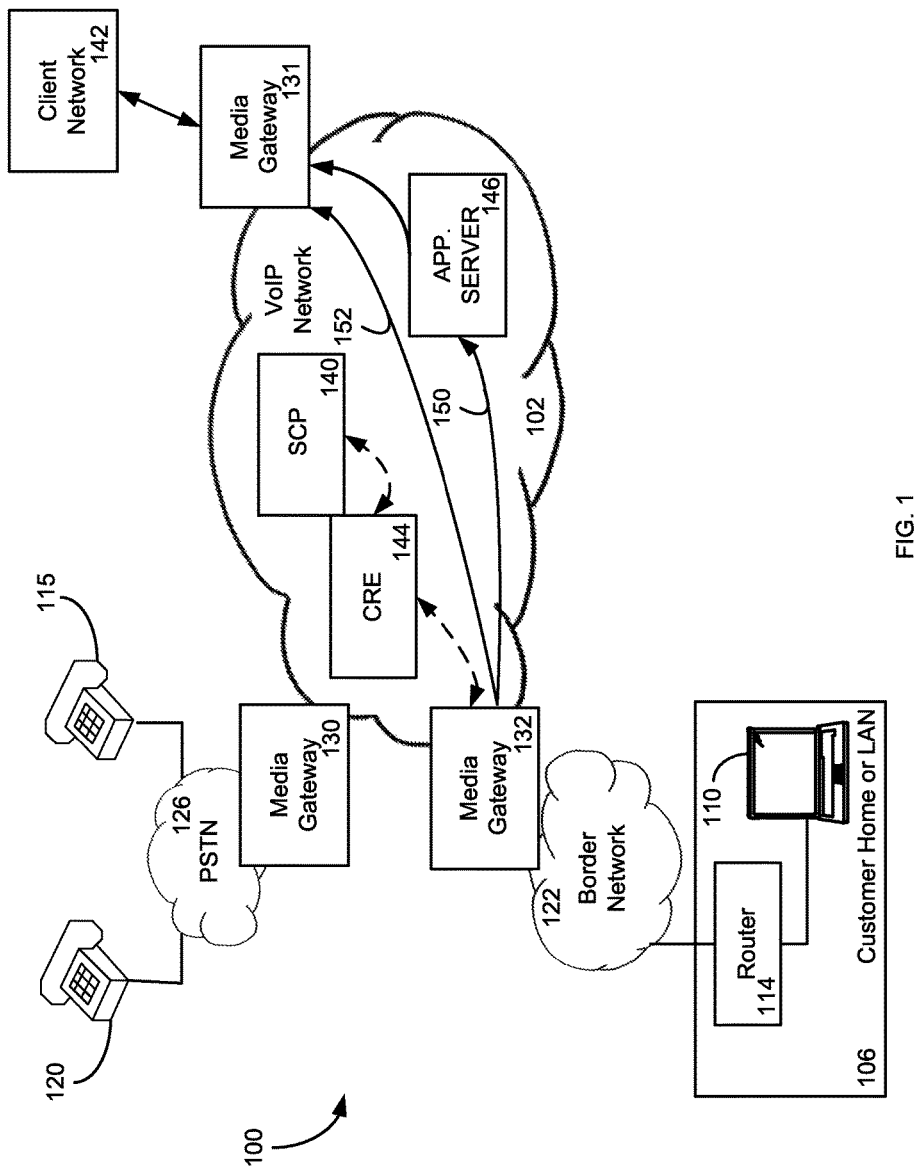
FIG. 1 is a schematic diagram illustrating an exemplary Voice over Internet Protocol (VoIP) operating environment in accordance with one embodiment.

FIG. 1 illustrates an exemplary operating environment 100 for providing toll-free services to customers in an enterprise environment of a telecommunications network. The environment 100 provides for establishing communication sessions between network users. With specific reference to FIG. 1, the environment 100 includes a VoIP network 102, which may be provided by a wholesale network service provider. However, while the environment 100 of FIG. 1 shows a configuration using the VoIP network 102; it should be appreciated that portions of the network may include non IP-based routing. For example, network 102 may include devices utilizing time division multiplexing (TDM) or plain old telephone service (POTS) switching. In general, the network 102 of FIG. 1 may include any communication network devices known or hereafter developed.

The VoIP network 102 includes numerous components such as, but not limited to gateways, routers, and registrars, which enable communication across the VoIP network 102, but are not shown or described in detail here because those skilled in the art will readily understand these components. More relevant to this description is the interaction and communication between the VoIP network 102 and other entities, such as the one or more customer home or business local area networks (LANs) 106, where a user of the network will connect with the network and, more particularly, the application server (AS) 146 of the network.

Customer network 106 can include communication devices such as, but not limited to, a personal computer or a telephone 110 connected to a router/firewall 114. Although shown in FIG. 1 as computer 110, the communication devices may include any type of communication device that receives a multimedia signal, such as an audio, video or web-based signal, and presents that signal for use by a user of the communication device. The communication and networking components of the customer network 106 enable a user at the customer network 106 to communicate via the VoIP network 102 to other communication devices, such as another customer network and/or an analog telephone 115, 120. Components of the customer network 106 are typically home- or business-based, but they can be relocated and may be designed for easy portability. For example, the communication device 110 may be wireless (e.g., cellular) telephone, smart phone, tablet or portable laptop computer. In some embodiments, multiple communication devices in diverse locations that are owned or operated by a particular entity or customer may be connected through the VoIP network 102. Such collections of may be referred to as an "enterprise network" or simply an "enterprise". In general, an enterprise network is a logical network of devices that communicate over the VoIP network 102 that may be treated by the VoIP network as a single entity. In addition, an enterprise network may include several other enterprise networks, in some embodiments.

The customer network 106 typically connects to the VoIP network 102 via a border network 122, such as one provided by an Internet Service Provider (ISP). The border network 122 is typically provided and maintained by a business or organization such as a local telephone company or cable company. The border network 122 may provide network/communication-related services to their customers. In contrast, the communication device 120 accesses, and is accessed by, the VoIP network 102 via a public switched telephone network (PSTN) 126 operated by a local exchange carrier (LEC). Communication via any of the networks can be wired, wireless, or any combination thereof. Additionally, the border network 122 and PSTN 126 may communicate, in some embodiments, with the VoIP Network 102 through a media gateway device (130, 132). For ease of instruction, only three communication devices 110, 115, 120 are shown communicating with the VoIP network 102; however, numerous such devices, and other devices, may be connected with the network, which is equipped to handle enormous numbers of simultaneous calls and other communications.

In general, a user of the network 102 utilizes one or more of the communication devices to transmit a communication to the network. For example, the user may place a toll-free telephone call to the network 102 from a telephone 120 associated with the network. Upon receipt, the network 102 routes the communication to a routing device 140 or routing devices integrated within the network 102. In the example where the communication is a toll-free communication, the routing devices may include a core routing engine (CRE) device 144 and/or a service control point (SCP) device 140. It should be appreciated that the routing devices 140, 144 may be a part of the network 102, may be separate from the network, or may have portions deployed in the network and out of the network. In addition, routing devices 140, 144 may be resident on one or more components of the VoIP network 140, including several instances of the routing devices integrated throughout the network 102. Further, although only a single instance of the routing devices 140, 144 are illustrated in FIG. 1, any number of additional routing devices may be present in the network 102.

The CRE 144 is a routing device configured to route communications through the network 102. In particular, the CRE 144 may include a database of telephone numbers or IP addresses associated with the network 102 and the destination or location of the numbers in the database. When a communication is received at the CRE 144, the CRE associates the communication with a destination device, and provides the route through the network 102 to the destination device. With this route or routing information, the communication may be transmitted through the components of the network 102 to the destination device to connect the caller with the destination device. In general, the destination device for the communication may be another component of the network 102, a media gateway associated with the network, a dedicated trunk group associated with a client to the network, or the like.

In instances where the communication is a toll-free communication, the CRE 144 may route the received communication to the SCP 140. The SCP is configured to receive the toll-free communication, determine the destination or communication device the toll-free communication is intended for, and provide a translation of the toll-free incoming communication destination into a destination associated with the determined destination. For example, the user of the network 102 uses a communication device 110, 115, 120 to transmit a toll-free communication to the network. The toll-free communication may be a common number or destination for any number of users connected to the network 102. The communication is received by the media gateway (130,132) and routed through the network 102 to the CRE 144, and then on to the SCP 140. The SCP 140 receives the communication and, in response and described in more detail below, determines a destination or customer network 142 to which the toll-free communication is to be routed.

In one embodiment, the toll-free communication is associated with a particular client or customer of the network 102 such that a destination address for the communication can be determined from the incoming communication. Thus, similar to the CRE 144, the SCP 140 may include a database that correlates a toll-free communication with a destination network 142 connected to the network 102 and associated with the incoming communication. Further, the SCP 140 may then provide a route for the communication to the client network 142 or media gateway 131 associated with a client network for connection to the client network. In a Session Initiation Protocol (SIP) based network, the CRE 144 and SCP 140 may provide one or more SIP commands to re-route the communication to the client network 142. Once connected, the user and the client network 142 may exchange communications through the network 102.

Additionally, the network 102 may include an application server 146 configured to provide some toll-free services for one or more customers to the network. In particular, an enterprise network configuration of a particular customer of the network 102 may utilize the application server 146 to provide one or more toll-free services to the receiving customer. For example, the application server 146 may provide one or more of the toll-free communication, such as maximum number of concurrent calls, an interactive menu presented to a caller of the client, conference calling, overflow routing, and the like. In general, the application server 146 may be programmed or otherwise configured to provide any type of toll-free telecommunication features to a customer.

In some particular instances, the toll-free features provided by the application server 146 may not be available for some customers to the network 102. For example, many customers to the network 102 utilize a dedicated trunk group to connect to the network. A dedicated trunk group is a trunk of the network 102 that is reserved or dedicated to a particular customer. Such a connection to the network 102 may be attractive to a customer that needs several communication lines to the network. In this manner, the network 102 may route all communications intended for the customer to the dedicated trunk group so that the customer may route the incoming communications to the proper destination. This configuration provides the customer with added flexibility in processing incoming communications to the customer's network 142. For example, the customer may utilize dialed number information service (DNIS) information to determine which toll-free number was dialed to access the customer. This allows the customer to provide specific routing of the toll-free communication (billing, sales, etc.) and access to different menus to process the communication when the communication is received at the customer's network.

For toll-free communications, the network 102 (and in particular the SCP 140) may process the communications differently depending on whether the destination is a communication device or a dedicated trunk group of the customer. As described above, the SCP 140 configured to receive the toll-free communication, determine the destination or communication device the toll-free communication is intended for, and provide a translation of the toll-free incoming communication destination into a destination associated with the determined destination. In the case where the destination is a communication device, the SCP 140 translates the dialed toll-free number into a telephone number associated with the destination device or customer. Further, the returned routing information for the communication may include transmitting the communication to the application server 146 for the addition of one or more toll-free features. This instance is illustrated in FIG. 1 as communication flow 150. The application server 140, in turn, processes the communication based on the destination telephone number of the customer, applies one or more features to the communication based on the customer's agreement with the network 102, and routes the communication to the destination device.

In the case where the destination is a dedicated trunk group, however, the translation performed by the SCP 140 translates the dialed toll-free number into a destination trunk group (DTG) identifier and a DNIS number or string of digits. The DTG translation of the dialed toll-free number is then recognized by the network 102 as belonging to the dedicated trunk group of the customer and routed accordingly. The DNIS digits are then passed to the customer's network as directed by the SCP 140 for use by the customer's network. In most instances, however, the routing of the communication to the dedicated trunk group would not include the application server 146 such that the features provided by the application server are typically not available for toll-free communications intended for a customer with a dedicated trunk group configuration. This instance is illustrated in FIG. 1 as communication flow 152. Thus, embodiments of the present disclosure provides customers to the network 102 connected through a dedicated trunk group all of the available toll-free features of the network, such as those features provided by the application server 146.

Figure 2:
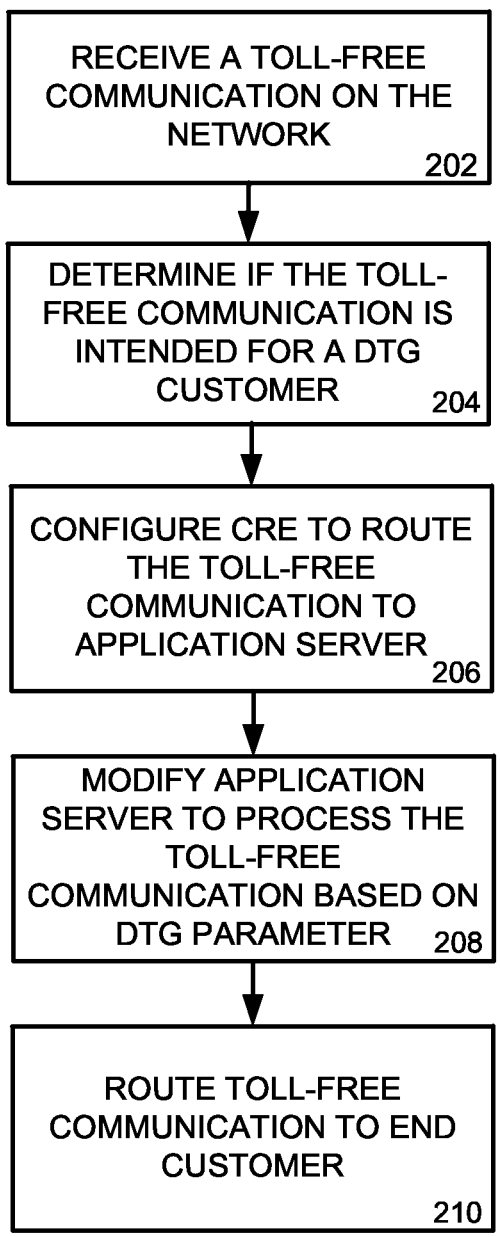
FIG. 2 is a flowchart illustrating a method for a first embodiment for routing a toll-free communication through an application server to a dedicated trunk group.

In particular, FIG. 2 is a flowchart illustrating a method for a first embodiment for routing a toll-free communication through an application server 146 to a customer of a telecommunications network 102 utilizing a dedicated trunk group connection to the network. In general, the operations of the method of FIG. 2 operate to eliminate communication flow 152 of FIG. 1 for those customers that are connected to the network 102 through a dedicated trunk group configuration. Thus, the toll-free features provided by the application server 146 may be applied to any toll-free communication through the network 102, including toll-free communications intended for dedicated trunk group-type customers to the network. The operations of FIG. 2 may be performed by any component of the network 102, including sharing execution of one or more of the operations between components of the network. In other embodiments, the operations may be performed by components of the client's network or other type of telecommunication components.

Beginning in operation 202, the network 102 receives a toll-free communication. As discussed above, this communication may originate from a communication device 110, 115, 120 associated with the network and may be intended for another communication device or client network 142 associated with the network. In one particular example, the client network 142 may include a dedicated trunk group connection to the network 102 through which toll-free communications are received. Upon receipt, the communication may be routed through the network 102 to the CRE 144, identified by the CRE as a toll-free communication, and routed to the SCP 140 for processing. The SCP 140 may then determine if the toll-free communication is intended for a dedicated trunk group customer (operation 304) and translate the toll-free communication to a destination number or DTG identifier for further routing through the network 102, as described above. In particular, for customers connected to the network 102 through a dedicated trunk group, the SCP 140 includes a parameter or identifier for the customer's dedicated trunk group for routing through the network. This is known as the Destination Trunk Group (DTG) parameter. For customers that do not use a dedicated trunk group, the SCP 140 includes the destination telephone number or other identifier of the customer's communication device for routing.

In operation 206, the CRE 144 of the network 102 is configured to route the toll-free communications to the application server 146. In particular, the CRE 144 is configured to route toll-free communications intended for a dedicated trunk group customer to the application server. Previously, toll-free communications intended for dedicated trunk group customers would be routed directly to the trunk group without being routed through the application server 146. In one embodiment, the CRE 144 may include a routing table that indicates that toll-free communications intended for a dedicated trunk group customer is to be routed to the application server. In one particular embodiment, the application server destination for the toll-free communication may be included in a SIP header associated with the toll-free communication. Thus, by altering to configuring the routing table, the network 102 may route the toll-free communications to the application server.

In operation 208, the application server 146 may be modified to process a toll-free communication based on the DTG parameter associated with the communication. Previously, the application server 146 may be configured to only process communications associated with a destination telephone number. Thus, because communications intended for dedicated trunk group customers did not include a destination telephone number (but rather a DTG parameter or identifier), the application server 146 could not route the communication to the customer. The network 102 addressed this issue by routing the communication to the dedicated trunk group customer and bypassing the application server. However, in this embodiment, the toll-free communication may be routed to the application server 146. Further, the application server 146 may be configured to account for dedicated trunk group customer communications and process the communication based on the DTG parameter associated with the communication. For example, the application server 146 may be configured to detect the inclusion of the DTG parameter associated with the communication. When the DTG parameter is detected, the application server may determine the intended customer's network and provide a route for the communication, accordingly. In particular, the application server 146 may be configured to determine the media gateway 131 or other interface component of the network 102 connected to the customer's network 142 and provide the routing information to route the communication to the media gateway. In this manner, the application server 146 is configured to process the routing of a toll-free communication to the destination device through the destination telephone number or the DTG parameter of the communication.

Further, because the application server 146 is configured to correctly process or route the toll-free communication intended for dedicated trunk group customers, the application server may also provide one or more of the toll-free features of the application server. For example, the application server 146 may provide features such as maximum number of concurrent calls, an interactive menu presented to a caller of the client, conference calling, overflow routing, and the like to toll-free communications intended for dedicated trunk group customers to the network 102. These features may be based on an identification of the DTG associated with the customer and an agreement between the customer and the network 102. Once the features of the application server 146 are applied to the communication, the application server may then route the toll-free communication to the end user in operation 210. Also, through this embodiment, the toll-free communication may retain the DNIS translation applied by the SCP 140 when intended for a dedicated trunk group customer. Thus, in addition to the features applied by the application server 146, the dedicated trunk group customer may retain the functionality at the client's network 142 based on the DNIS of the toll-free communication.

In a similar manner, communications (both toll-free and non-toll-free communications) from the customer's network 142 may follow a reverse path through the network 102 as that described above. For example, a communication from the client network 142 may arrive at the media gateway 131 of the network 102 and be routed to the application server. For toll-free communications, the application server may provide one or more of the features discussed above. For example, the application server 146 may apply the outbound communication into the concurrent calling feature for the client. From the application server 146, the communication may be routed to the media gateway 132, which may refer to the CRE 144 for routing of the outbound communication. In addition, one or more additional components may be utilized in routing the outbound call. For example, a routing device within the network 102 or in another telecommunication network associated with the VoIP network may be referenced to determine the destination of the communication. Regardless of which network the communication is destined, one or more features of the application server 146 may be applied to the outbound communication from the client's network 142.

Figure 3:
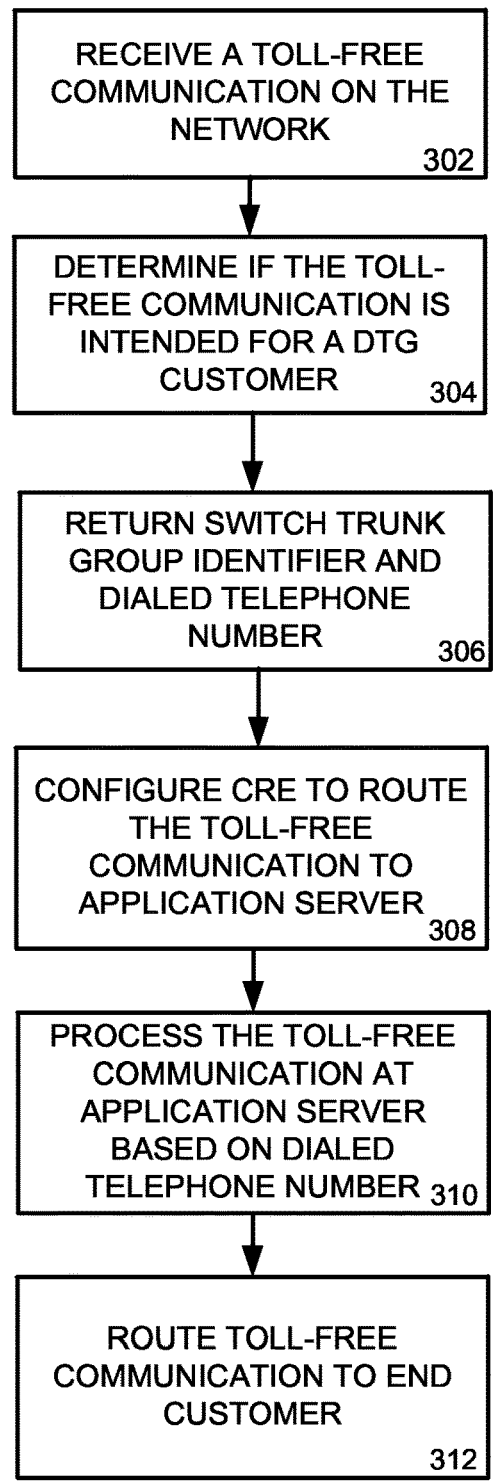
FIG. 3 is a flowchart illustrating a method for a second embodiment for routing a toll-free communication through an application server to a dedicated trunk group.

In some instances, the application server 146 may not be configurable by the network or an administrator of the network. For example, the application server 146 may be controlled and configured by a vendor to the network 102. Thus, another embodiment of the present disclosure is illustrated in the flowchart of FIG. 3. In particular, the embodiment of FIG. 2 may be utilized by the network 102 to provide the application server features when the application server is not configurable by the network. Many of the operations for this particular embodiment are similar to the operations described above such that reference to the operations of FIG. 2 is included below. Similar to the method described above, the operations of FIG. 3 may also be performed by any component of the network 102, including sharing execution of one or more of the operations between components of the network. In other embodiments, the operations may be performed by components of the client's network or other type of telecommunication components.

Similar to above, the network 102 receives a toll-free communication and, upon receipt, the communication may be routed through the network 102 to the CRE 144, identified by the CRE as a toll-free communication, and routed to the SCP 140 for processing (operation 302). The SCP 140 may then determine if the toll-free communication is intended for a dedicated trunk group customer (operation 304). However, in this embodiment, if the toll-free communication is intended for a dedicated trunk group customer to the network, the SCP 140 may not translate the toll-free communication to a destination number or identifier for further routing through the network 102, as described above. Rather, the SCP 140 may return an identification of the switch trunk group to which the customer is connected for routing purposes (operation 306). In addition, the SCP 140 is further configured to include the dialed toll-free telephone number and associate the dialed toll-free telephone number with the communication. Thus, rather than including a dedicated trunk group identifier with the communication, the SCP 140 retains the dialed toll-free telephone number with the communication.

Also, upon returning the communication to the CRE 144, the CRE is configured to route the communication based on the switch trunk group identified by the SCP 140 (operation 308). This routing may, in some instances, include routing the communication to the application server 146 at the Internet Protocol (IP) address of the application server. The application server 146, in turn, identifies the dialed toll-free telephone number included with the communication as belonging to a subscriber to the application server (operation 310). In particular, the application server may maintain a list of subscribers to the server that are identifiable by the dialed toll-free telephone number. This subscriber list may also include a trunk group identifier to an enterprise to which the subscriber belongs. With the trunk group identifier and the enterprise identified, the application server may determine which features the enterprise customer has requested, apply one or more of those features to the communication, and route the communication to the customer's enterprise. The enterprise may include a dedicated trunk group connection to the network 102. In addition, the application server may perform one or more translations of the information in the communication, such as a typical digit manipulation of the communication for routing purposes. In this manner, the application server may both apply one or more toll-free features to the communication, while also routing the communication to an end customer connected to the network 102 through a dedicated trunk group (operation 312).

In one particular embodiment (illustrated in the network 400 of FIG. 4), the network may include one or more network servers 402 associated with the application servers 404 of the network 102. In general, a network server 402 may act as a routing engine for one or more application servers 404. Thus, one network server 402 may service many application servers 404, although any combination of network servers and application servers is possible. As explained in more detail below, the network server 402 receives communications for or from the application servers and directs the communications accordingly. In one embodiment, the network server 402 may perform load balancing for communications to a cluster of application servers to prevent any one application server from being overloaded with communications from the network 102.

Figure 4:
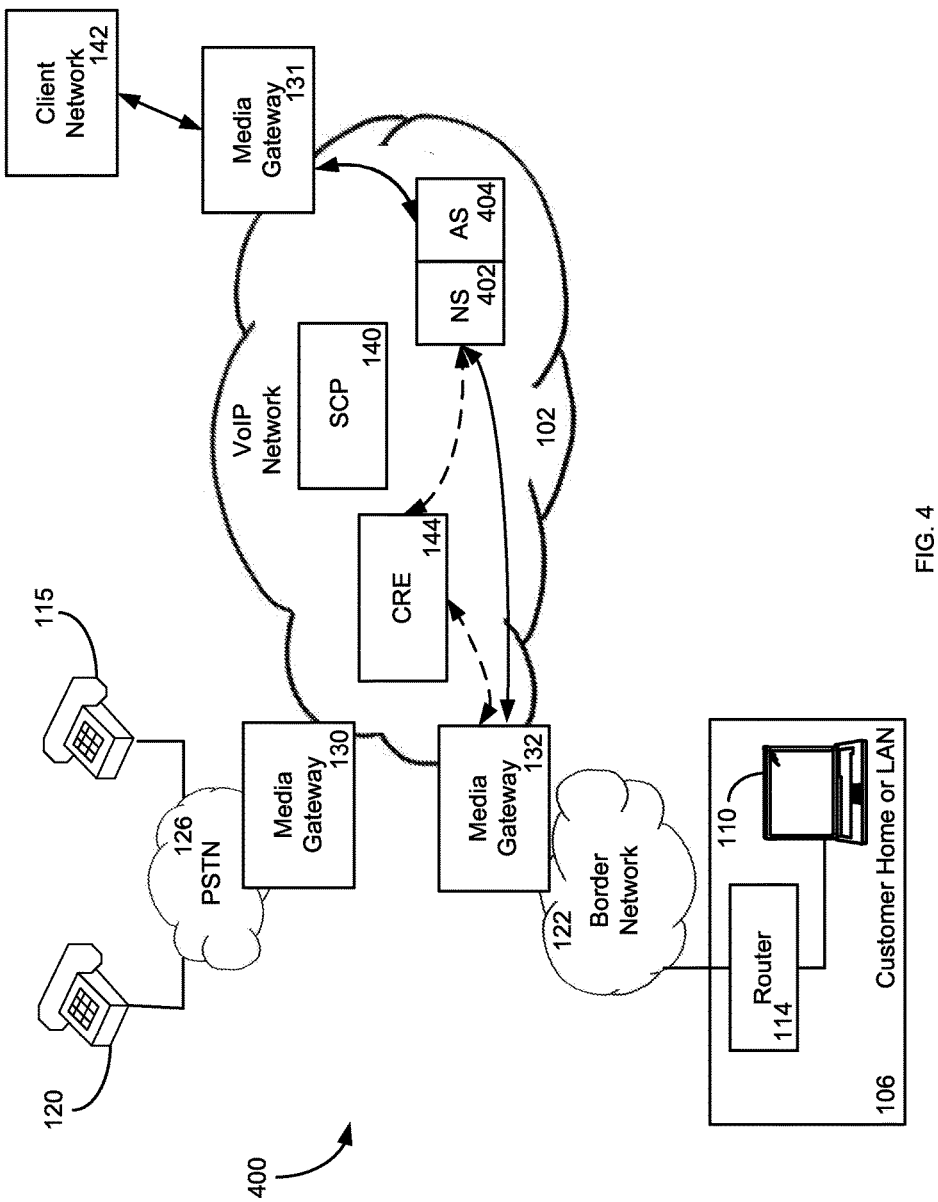
FIG. 4 is a schematic diagram illustrating an exemplary Voice over Internet Protocol (VoIP) operating environment in accordance with a second embodiment

In addition, the other components illustrated in FIG. 4 are similar or the same as those discussed above with relation to FIG. 1. As such, those components retain the numerical identifiers from FIG. 1 into FIG. 4. In general, the description of the call flow included below applies for outbound toll-free communications from an enterprise network to another enterprise network. To support this circumstance, one or more of the network servers 402 of the network 102 may be provided or loaded with a routing list that routes the communication in a different manner depending on if the communication is received at the network server from the network 102 or from one or more of the application servers 404 associated with the network server.

In particular, a toll-free communication may originate at the enterprise client network 142 and be transmitted to the network 102 through the media gateway 131. The media gateway 131 then transmits the communication to the network server 402 for transmission to the application server 404. More particularly, the media gateway 131 may transmit the communication or otherwise contact the network server 402. The network server 402 then determines which application server 404 of the network 102 to transmit the communication. In this manner, the network server 402 may load balance communications among the multiple application servers 404 associated with the network server. Once an application server 404 is selected by the network server 402, the toll-free communication is routed to the application server. The application server 404 identifies the communication as coming from the enterprise client and may then apply one or more of the toll-free features to the communication.

Once the features are applied to the communication, the application server 404 may then contact the network server 402 for transmission of the communication to the destination device. The network server 402 associates the communication with the particular application server 404 that transmitted the communication and returns a routing device within the network for routing of the communication. For example, the network server 402 may route the communication to the CRE 144 of the network 102 to determine where the communication is further routed. The CRE 144 (and other routing components of the network 102 or an external network) may then further provide routing information for the communication. However, because the communication is intended for an enterprise network of the network 102, the communication may be returned to the application server 404 as an inbound communication. In particular, the network 102 may route the communication to the network server 402 for processing. Similar to above, because the request for routing is originating from the network 102, the network server 402 determines which application server 404 the communication is associated with and routes the communication accordingly. Once at the application server 404, the communication may then be routed to the destination device. In one particular embodiment, the destination device may be a dedicated trunk group associated with the destination client.

In one embodiment, an administrator of the network 102 may configure the network server 402 to perform one or more of the operations described above for routing of enterprise toll-free communications. In another embodiment, the network server 402 may be configured prior to inclusion in the network 102. In any event, the network server 402 may include routing information that distinguishes between communications from and intended for an application server 404 and route the communication accordingly.

Figure 5:
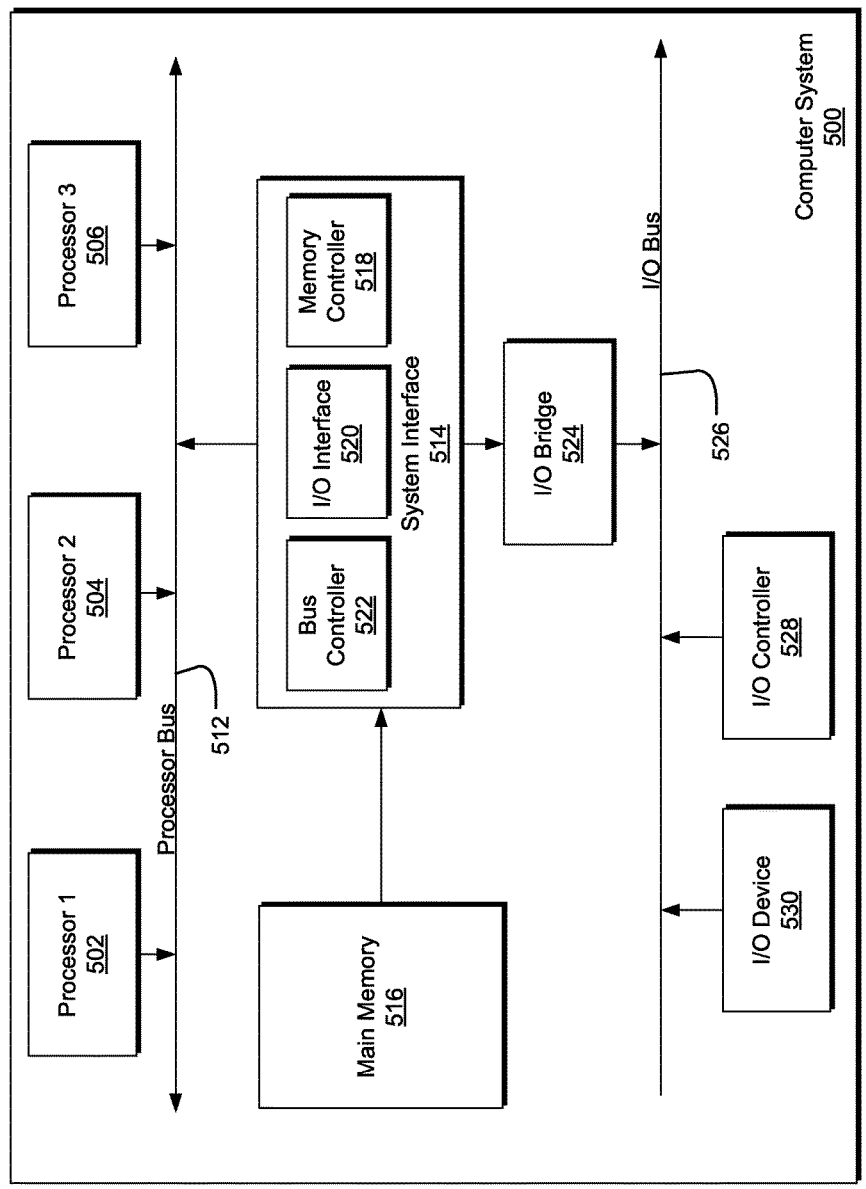
FIG. 5 is a diagram illustrating an example of a computing system which may be used in implementing embodiments of the present disclosure.

FIG. 5 is a block diagram illustrating an example of a computing device or computer system 500 which may be used in implementing the embodiments of the components of the network disclosed above. For example, the computing system 500 of FIG. 5 may be used to implement the various components of the virtual local loop system 202 discussed above. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 514 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 540, as illustrated.

I/O device 540 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

We claim:

1. A method for operating a telecommunications network, the method comprising:

receiving a toll-free communication request from a device in communication with the telecommunications network, the toll-free communication request for a dedicated trunk group customer associated with the telecommunications network;

transmitting the toll-free communication request to a routing device of the telecommunications network, the routing device configured to associate a trunk group identifier and a dialed toll-free telephone number with the toll-free communication request;

routing the toll-free communication request to an application server associated with the telecommunications network based at least on the dialed toll-free telephone number associated with the toll-free communication request;

applying, through the application server, one or more toll-free features to the toll-free communication request, wherein the one or more toll-free features comprise concurrent calling monitoring for the dedicated trunk group customer;

routing the toll-free communication request having the one or more applied toll-free features from the application server to the dedicated trunk group customer associated with the telecommunications network;

receiving an outgoing communication from the dedicated trunk group customer;

routing the outgoing communication to the application server; and applying, by the application server, the concurrent calling monitoring to the outgoing communication.

2. The method of claim 1 further comprising:
translating, at the routing device, the dialed toll-free telephone number associated with the toll free communication request into a dialed number information services number; and
associating the dialed number information services number with the toll-free communication request.

3. The method of claim 1 wherein routing the toll-free communication from the application server to the dedicated trunk group customer is based at least on the trunk group identifier and the dialed toll-free telephone number associated with the toll-free communication request.

4. The method of claim 3 wherein routing the toll-free communication from the application server to the dedicated trunk group customer comprises:
configuring the application server to determine the associated trunk group identifier of the toll-free communication; and
processing the toll-free communication based at least on the dedicated trunk group customer.

5. The method of claim 1 wherein the application server is associated with an enterprise network configuration of the dedicated trunk group customer to the telecommunications network.

6. A system for operating a telecommunications network, the system comprising:
at least one processor;
memory, operatively connected to the at least one processor and storing instructions that, when executed, cause the at least one processor to perform a method, the method comprising:
receiving a toll-free communication request from a device in communication with the telecommunications network, the toll-free communication request for a dedicated trunk group customer associated with the telecommunications network;
transmitting the toll-free communication request to a routing device of the telecommunications network, the routing device configured to associate a trunk group identifier and a dialed toll-free telephone number with the toll-free communication request;
routing the toll-free communication request to an application server associated with the telecommunications network based at least on the dialed toll-free telephone number associated with the toll-free communication request;
applying, through the application server, one or more toll-free features to the toll-free communication request, wherein the one or more toll-free features comprise concurrent calling monitoring for the dedicated trunk group customer;
routing the toll-free communication request having the one or more applied toll-free features from the application server to the dedicated trunk group customer associated with the telecommunications network;
receiving an outgoing communication from the dedicated trunk group customer;
routing the outgoing communication to the application server; and
applying, by the application server, the concurrent calling monitoring to the outgoing communication.

7. The system of claim 6, wherein the method further comprises:
translating, at the routing device, the dialed toll-free telephone number associated with the toll free communication request into a dialed number information services number; and
associating the dialed number information services number with the toll-free communication request.

8. The system of claim 6, wherein routing the toll-free communication from the application server to the dedicated trunk group customer is based at least on the trunk group identifier and the dialed toll-free telephone number associated with the toll-free communication request.

9. The system of claim 8, wherein routing the toll-free communication from the application server to the dedicated trunk group customer comprises:
configuring the application server to determine the associated trunk group identifier of the toll-free communication; and
processing the toll-free communication based at least on the dedicated trunk group customer.

10. The system of claim 6, wherein the application server is associated with an enterprise network configuration of the dedicated trunk group customer to the telecommunications network.

11. A non-transitory computer readable medium containing instructions that, when executed by at least one processor, cause the at least one processor to perform a method for operating a telecommunications network, the method comprising:
receiving a toll-free communication request from a device in communication with the telecommunications network, the toll-free communication request for a dedicated trunk group customer associated with the telecommunications network;
transmitting the toll-free communication request to a routing device of the telecommunications network, the routing device configured to associate a trunk group identifier and a dialed toll-free telephone number with the toll-free communication request;
routing the toll-free communication request to an application server associated with the telecommunications network based at least on the dialed toll-free telephone number associated with the toll-free communication request;
applying, through the application server, one or more toll-free features to the toll-free communication request, wherein the one or more toll-free features comprise concurrent calling monitoring for the dedicated trunk group customer;
routing the toll-free communication request having the one or more applied toll-free features from the application server to the dedicated trunk group customer associated with the telecommunications network;
receiving an outgoing communication from the dedicated trunk group customer;
routing the outgoing communication to the application server; and
applying, by the application server, the concurrent calling monitoring to the outgoing communication.

12. The non-transitory computer readable medium of claim 11, wherein the method further comprises:
translating, at the routing device, the dialed toll-free telephone number associated with the toll free communication request into a dialed number information services number; and
associating the dialed number information services number with the toll-free communication request.

13. The non-transitory computer readable medium of claim 11, wherein routing the toll-free communication from the application server to the dedicated trunk group customer is based at least on the trunk group identifier and the dialed toll-free telephone number associated with the toll-free communication request.

14. The non-transitory computer readable medium of claim 13, wherein routing the toll-free communication from the application server to the dedicated trunk group customer comprises:
   configuring the application server to determine the associated trunk group identifier of the toll-free communication; and
   processing the toll-free communication based at least on the dedicated trunk group customer.

15. The non-transitory computer readable medium of claim 11, wherein the application server is associated with an enterprise network configuration of the dedicated trunk group customer to the telecommunications network.

* * * * *